United States Patent [19]

Delaney et al.

[11] Patent Number: 4,539,617
[45] Date of Patent: Sep. 3, 1985

[54] AC POWER LINE TRANSIENT SUPPRESSING CIRCUIT

[75] Inventors: Sean Delaney; Herbert R. Montague, both of Binghamton, N.Y.

[73] Assignee: Control Concepts Corporation, Binghamton, N.Y.

[21] Appl. No.: 566,432

[22] Filed: Dec. 28, 1983

[51] Int. Cl.³ .............................................. H02H 9/04
[52] U.S. Cl. ...................................... 361/58; 307/543; 323/230; 323/908; 328/171; 333/181; 361/91; 361/110; 361/111; 361/113
[58] Field of Search ...................... 361/54, 56, 58, 91, 361/110, 111, 113; 307/542, 543, 549, 551; 328/167, 170, 171; 333/167, 181, 182, 174; 323/229–231, 908, 352, 293

[56] References Cited

U.S. PATENT DOCUMENTS

| | | | |
|---|---|---|---|
| 2,585,069 | 2/1952 | Ziegler | 361/110 X |
| 3,047,746 | 7/1962 | Berkery . | |
| 3,090,017 | 5/1963 | Novic | 333/181 |
| 3,250,919 | 5/1966 | Maass | 328/170 X |
| 3,305,801 | 2/1967 | Hartenstein | 333/181 |
| 3,308,311 | 3/1967 | Swanson . | |
| 3,461,308 | 8/1969 | Kalkner et al. . | |
| 3,524,081 | 8/1970 | Campanella | 307/543 |
| 3,755,750 | 8/1973 | Heberling . | |
| 3,947,751 | 3/1976 | Bray . | |
| 4,068,279 | 1/1978 | Byrnes . | |
| 4,089,032 | 5/1978 | Dell Orfano . | |
| 4,095,163 | 6/1978 | Montague . | |
| 4,131,927 | 12/1978 | Tsuchiya et al. . | |
| 4,156,838 | 6/1979 | Montague . | |
| 4,191,986 | 3/1980 | ta Huang et al. . | |

FOREIGN PATENT DOCUMENTS

| | | | |
|---|---|---|---|
| 1959134 | 11/1970 | Fed. Rep. of Germany | 361/111 |
| 1156612 | 7/1969 | United Kingdom | 328/167 |

*Primary Examiner*—Harry E. Moose, Jr.
*Attorney, Agent, or Firm*—Lowe, King, Price & Becker

[57] ABSTRACT

An AC power line transient suppression circuit comprises a bi-directional series breakdown element in combination with a series inductor and a shunt capacitor.

19 Claims, 7 Drawing Figures

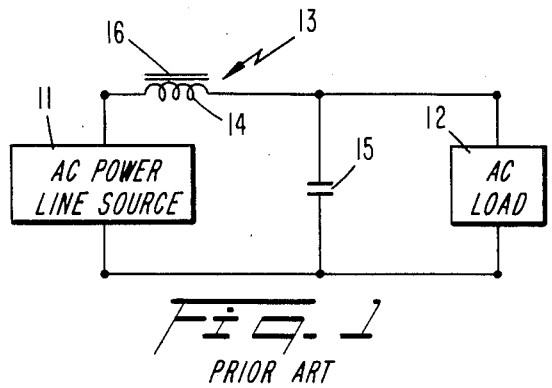
Fig. 1
PRIOR ART
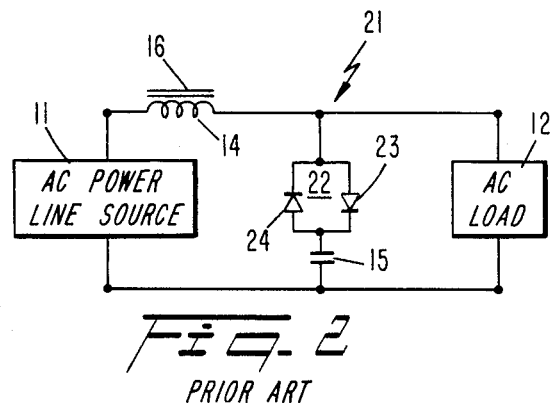
Fig. 2
PRIOR ART
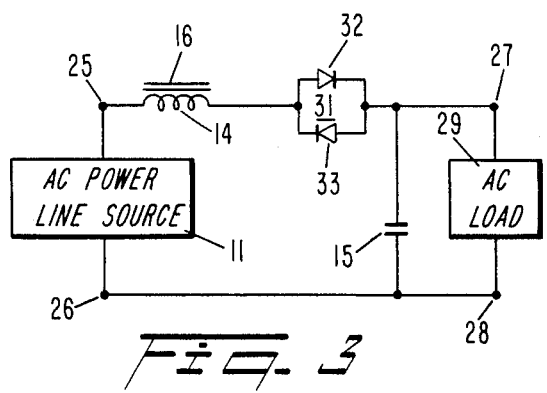
Fig. 3
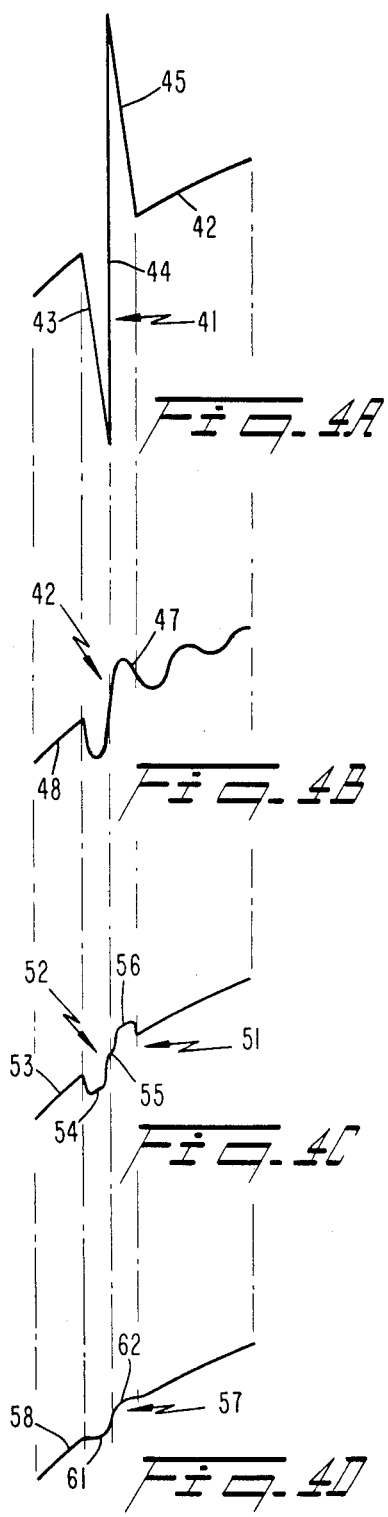
Fig. 4A
Fig. 4B
Fig. 4C
Fig. 4D

AC POWER LINE TRANSIENT SUPPRESSING CIRCUIT

TECHNICAL FIELD

The present invention relates generally to power line transient suppression circuits and more particularly to a power line transient suppression circuit including a bi-directional series breakdown element in combination with a series inductor and a shunt capacitor.

BACKGROUND ART

A frequently employed prior art AC power line transient suppressor is a low pass filter including a series inductor and shunt capacitor. When a spike on a power line is applied to such a low pass filter there is usually a ringing effect which produces oscillations for a significant percentage of a cycle of the power line voltage. The oscillations occur at a frequency determined by the resonant frequency of the inductor and capacitor forming the low pass filter. The high frequency ringing effects can be dampened by appropriate selection of a Q for the coil. Such dampening, however, introduces substantial dissipation of power line energy supplied to a load connected across the shunt capacitor.

In commonly assigned Montague U.S. Pat. Nos. 4,095,163 and 4,156,838, there is disclosed a circuit which reduces the amplitude and number of cycles of the ringing effect introduced by a low pass filter transient power line suppressor. In the circuit disclosed by the Montague patents, bi-directional breakdown elements are connected in series circuit with a capacitor, with the series circuit being connected in shunt with a load. It has been found that the series circuit including the capacitor and bi-directional breakdown element in shunt with the load causes a considerable decrease in the amplitude and high frequency content of oscillations which occur in response to a transient spike relative to the low pass filter configuration.

DISCLOSURE OF INVENTION

As a result of experiments we conducted on the circuit disclosed in Montague U.S. Pat. No. 4,095,163 we found that an additional reduction in the amplitude and high frequency content of the oscillations which would otherwise be coupled to an AC power line load in response to a transient on the power line is achieved by connecting the bi-directional breakdown element in series with the inductor and the load instead of in series with the capacitor. Thus, the same current which flows through the inductor flows through the bi-directional breakdown element and thence is divided to flow in parallel into the AC load and a shunt branch including the capacitor.

In accordance with the invention, a circuit for suppressing transient spikes on an AC power line so as to largely decouple the effects of the spikes from an AC load connected to be driven by current flowing through a terminal of the power line comprises a series branch connected between the power line terminal and a terminal of the load. The series branch includes, in series, an inductor and bi-directional breakdown means having a predetermined threshold conduction level such that the breakdown means has relatively high and low impedances in response to the voltage across it being respectively less and greater than a threshold conduction level. The load and a shunt branch connected across terminals of the load are connected to the series branch to be responsive to current flowing through the inductor and breakdown means.

The load has an impedance that causes a substantial reduction in high frequency components relative to a first suppression circuit having no breakdown means and a low pass filter with a series inductor and a shunt capacitor having the same values as the inductor and capacitor of the inventive circuit. The load also is an impedance that causes a substantial reduction in high frequency components relative to a second suppression circuit having a bi-directional breakdown means in series with the inventive capacitor and a series inductor and shunt capacitor having the same values as the inventive inductor and shunt capacitor. To achieve the desired response, the load is reflected to the load terminals as a resistive element or a capacitive reactance or the combination of a resistive element and a capacitive reactance. It is important for the load not to be heavily inductive. It has been experimentally determined that if the load is heavily inductive, there is a tendency for the amplitude of the high frequency components to be increased.

In a preferred embodiment, the bi-directional breakdown means includes first and second parallel diodes, each having an anode and cathode connected such that the anode of the first diode is connected to the cathode of the second diode and the cathode of the first diode is connected to the anode of the second diode. The diodes can be conventional silicon or germanium diodes or diodes having avalanche characteristics. Alternatively, the breakdown means can be a Zener diode, as disclosed in Montague U.S. Pat. No. 4,095,136.

It is important for the inductor to remain inductive for all currents applied to it. It is also important for the inductor to have a relatively high value, such as is attained by closely coupling a winding of the inductor to a magnetic core. To achieve these results, the magnetic core and the winding are designed so that the current flowing through the inductor does not cause the core to be saturated by the AC power line energy or energy coupled to the line by the spike.

The present invention is particularly adapted for use in connection with relatively low current loads, i.e., currents less than 5 to 7 amperes. If currents in excess of 5 to 7 amperes are coupled by the power line to the load, there is a tendency for excess energy dissipation in the series bi-directional breakdown means.

It is, accordingly, an object of the present invention to provide a new and improved AC power line transient suppression circuit.

Another object of the invention is to provide a new and improved AC power line transient suppressor particularly adapted for relatively low current applications and wherein there is a reduction in the amplitude and content of high frequency energy coupled to a load.

The above and still further objects, features and advantages of the present invention will become apparent upon consideration of the following detailed description of one specific embodiment thereof, especially when taken in conjunction with the accompanying drawings.

BRIEF DESCRIPTION OF DRAWINGS

FIG. 1 is a circuit diagram of a prior art low pass filter transient suppressor circuit;

FIG. 2 is a circuit diagram of a power line transient suppressor circuit, as disclosed in Montague U.S. Pat. No. 4,095,163;

FIG. 3 is a circuit diagram of a transient suppressor power line circuit in accordance with the present invention; and FIGS. 4A–D include waveforms for the responses of the circuits of FIGS. 1–3 to a transient spike superimposed on a portion of an AC power line sine wave.

BEST MODE FOR CARRYING OUT THE INVENTION

Reference is now made to FIG. 1 of the drawing wherein AC power line source 11 is connected to AC load 12 by a transient suppressor circuit 13. AC power line source 11 is typically an AC generator which derives 60 Hertz sinusoidal single phase voltage and current and a power transmission line connected to it. AC power line source 11 is susceptible to having high voltage transient spikes induced therein, for example, in response to lightning and the opening and closing of switches. AC load 12 is typically a reactive load or a resistive load, such as a heater, lamp, or a transformer driving a rectifier for supplying power to a DC output.

Transient suppressor 13 is a low pass filter including a series branch containing inductor 14 and a shunt branch containing capacitor 15. To provide maximum filtering, inductor 14 includes a magnetic core 16. The current supplied by source 11 through inductor 14 to AC load 12 and shunt capacitor 15 is such that core 16 is not saturated.

In response to a transient pulse occurring on power line source 11, low pass filter 13 materially reduces the amount of high frequency energy in the pulse which is coupled from source 11 to load 12. The energy in the pulse is attenuated by low pass filter 13. Filter 13 responds to the pulse as a relatively low Q series resonant circuit. Thereby, the energy in the pulse causes a ringing current to be established in load 12. The ringing current has a frequency determined primarily by the inductance of inductor 14 and the capacitance of capacitor 15. The amplitude of the ringing is determined by the amplitude of the pulse and the impedances of load 12, inductor 14 and capacitor 15; these impedances also determine a dampening factor for the ringing current.

To reduce the amplitude and number of cycles of the ringing current supplied by the filter of FIG. 1 to load 12, AC power line source 11 is connected to AC load 12 by the prior art transient suppression circuit 21 illustrated in FIG. 2. Circuit 21 includes a series branch containing inductor 14, magnetically coupled to magnetic core 16, as well as a shunt branch including capacitor 15. The shunt branch includes, in series with capacitor 15, a bi-directional breakdown element having a predetermined threshold conducting level such that the element has relatively high and low impedances in response to the voltage across it being respectively less and greater than a threshold conductive level. In one preferred embodiment, element 16 includes a pair of back-to-back, parallel connected silicon diodes 23 and 24. The anode of diode 23 is connected to the cathode of diode 24 so that a common terminal for these electrodes is connected to a common terminal for inductor 14 and load 12. The cathode of diode 23 and the anode of diode 24 are connected together to a common terminal which is connected to one electrode of capacitor 15. Assuming that inductors 14 and capacitors 15 of FIGS. 1 and 2 have the same value and that the same transient spike is superimposed on AC power line source 11 and that AC loads 12 of FIGS. 1 and 2 are the same, there is a considerable reduction in the amplitude and number of ringing cycles coupled by circuit 21 to the load of FIG. 2 relative to those coupled by circuit 13 to the load of FIG. 1. This is apparently because element 22 interrupts the ringing current.

In experimenting with the circuit of FIG. 2, we unexpectedly found that for resistive, capacitive and light inductive loads further suppression can be attained by connecting a bi-directional breakdown means having a predetermined threshold conduction level in series, rather than in shunt, with load 12 and inductor 14, as illustrated in FIG. 3. The conduction level is such that the breakdown means has relatively high and low impedances in response to the voltage across it being respectively less and greater than a threshold conduction level.

In particular, AC power line 11, having terminals 25 and 26, is connected by a series branch to terminals 27 and 28 of AC load 29. AC load 29 is shunted by capacitor 15. The series branch includes inductor 14, including magnetic core 16. Inductor 14 is series connected with breakdown element 31, which in one preferred embodiment includes parallel, back-to-back series diodes 32 and 33. The anode of diode 32 has a common terminal with the cathode of diode 33, with the common terminal being connected to one terminal of inductor 14, the remaining terminal of which is connected to power line source 25. The cathode of diode 32 has a common terminal with the anode of diode 33, with the common terminal being connected to terminal 27 of load 29 and to one electrode of capacitor 15.

For a resistive or capacitive load 29 which is identical to the load 12 of FIG. 2, and for inductors 14 and capacitors 15 of FIGS. 2 and 3 having identical values, there is a reduction in the amplitude of the ringing components and a reduction in the number of high frequency components in load 29 relative to load 12 of FIG. 2. The reduction in the amplitude and number of high frequency components probably occurs because of the dampening effect of the AC load on the current flowing through inductor 14 and bi-directional breakdown element 31.

Typically, diodes 32 and 33 are silicon diodes having a breakdown voltage of 0.7 volts. Alternatively, diodes 32 and 33 can be germanium diodes or avalanche diodes. Also, if a relatively high breakdown voltage is desired, diode 32 can be replaced by M series diodes, and diode 33 can be replaced by M series diodes. It is important for the breakdown devices to have the same characteristics in each direction. It is also to be understood that bi-directional breakdown element 31 can be connected between a common terminal of capacitor 15 and load terminal 28 and power line source terminal 26, instead of between inductor 14 and capacitor 15.

For typical power line applications, inductor 14 has an inductance of 1 millihenry, while capacitor 15 has a capacitance of 2 microfarads. The current supplied by power line source 11 to capacitor 15 and load 29 is such that core 16 is not saturated.

To achieve the improved results attained with the present invention, it is important for AC load 29 to be resistive and/or capacitive, or lightly inductive, i.e., have an inductance that is considerably less than the inductance of inductor 14 so that any ringing effect which the AC load has a tendency to introduce in the circuit is dampened. It is to be understood, however, that AC load 29 can be a transformer winding coupled to a resistive or capacitive load, which may include a half wave or full wave rectifier. It is also to be understood that the transient power line suppressor of FIG. 3 can be used in a multi-phase system. In such a situation, a transient suppression circuit identical to that illustrated in FIG. 3 is connected to the output terminals of each phase.

The relative performances of the circuits of FIGS. 1, 2 and 3 in response to an AC transient pulse superimposed on an AC wave derived by source 11 can be realized by inspection of FIGS. 4A-4D. In FIG. 4A, an AC pulse 31, having a peak to peak amplitude of 800 volts, is superimposed on sinusoidal waveform 42 while the sinusoidal waveform is in the first quarter cycle, i.e., going from zero volts to a positive peak voltage. Transient pulse 41 has a negative going steep leading edge 43, having an amplitude of 400 volts, followed by a steep positive going 800 volt transition 44, in turn followed by a negative going steep trailing edge 45, having an amplitude of 400 volts.

The circuit of FIG. 1 responds to pulse 41 and sinusoidal waveform 42 so that the voltage across AC load 12 has waveform 46, illustrated in FIG. 4B. Waveform 46 includes a series of damped sinusoidal oscillations 47 superimposed on sinusoidal waveform 48. The amplitude and number of dampened sinusoidal cycles 47 are determined by the values of inductor 14, capacitor 15, the impedance of load 12 and the Q of inductor 14.

The circuit of FIG. 2 responds to the waveform of FIG. 4A in a manner indicated by waveform 51, FIG. 4C. Waveform 51 is derived with the assumption that the inductor, capacitor, input and load of FIG. 2 are identical to those of FIG. 1. Waveform 51 includes transient portion 52 superimposed on sinusoidal segment 53. Transient portion 52 includes a first negative segment 54, followed by segment 55 having a short duration and a contour approximately the same as sinusoidal portion 53. Segment 55 is followed by a positive segment 56, in turn followed by sinusoidal portion 53. Negative going portion 54 and positive going portion 56 have similar shapes, i.e. both of them have relatively steep leading and trailing edges, and a relatively flat intermediate portion. The relatively steep leading and trailing portions of segments 55 and 56 contain high frequency components. The amplitudes of segments 54 and 56 are considerably lower than the amplitudes of the first and second half cycles of waveform 47, FIG. 4B. In addition, the damped sinusoid which persists in waveform 46 after the first two half cycles of damped sinusoid 47 does not subsist in waveform 51. Thereby, the circuit of FIG. 2 couples a wave having a lower amplitude and fewer half cycles to load 12 than the wave coupled by the circuit of FIG. 1. Thereby, the circuit of FIG. 2 provides better transient suppression than is attained with the circuit of FIG. 1.

The circuit of FIG. 3 responds to the waveform of FIG. 4A in the manner illustrated by FIG. 4D, assuming that inductors 14, capacitors 15, inputs and the capacitive and/or resistive loads of the circuits of FIGS. 1, 2 and 3 are the same. The waveform of FIG. 4D includes damped sinusoidal segment 57 superimposed on sinusoidal segment 58. Damped sinusoidal segment 57 includes positive and negative half cycles 61 and 62 which follow immediately after each other. The amplitudes of segments 61 and 62 are lower than the amplitudes of segments 54 and 56. The amplitudes of segments 61 and 62 are also lower than the amplitudes of the first two half cycles of damped sinusoid 47, FIG. 4B. Because of the damped sinusoidal nature of half cycles 61 and 62 there are fewer low frequency components coupled to AC load 29. In addition, the components which are coupled to load 29 have a lower amplitude than the components in either of the circuits of FIGS. 1 and 2. Thereby, greater suppression is surprisingly attained with the circuit of FIG. 3 than is attained with either of the circuits of FIGS. 1 or 2. It was also found that the improved suppression achieved by the circuit of FIG. 3 is not attained if a non-linear, i.e., breakdown, device is connected in series with capacitor 15. If a non-linear device is in the branch including capacitor 15, the improvement of the present result is not achieved; instead substantially the same suppression is attained as occurs with the circuit of FIG. 2.

While there has been described and illustrated one specific embodiment of the invention, it will be clear that variations in the details of the embodiment specifically illustrated and described may be made without departing from the true spirit and scope of the invention as defined in the appended claims.

We claim:

1. In combination, an AC source having AC power terminals, an AC load having AC load terminals, a capacitor connected in a branch shunting the AC load terminals, an inductor and bi-directional breakdown means connected between the AC power terminals and AC load terminals so that the same current flows from one of the AC power terminals through the inductor and bi-directional breakdown means, said same current being divided to flow in parallel through the AC load terminals and the shunt branch.

2. The circuit of claim 1 wherein the bi-directional breakdown means includes first and second parallel diodes each having an anode and cathode connected such that the anode of the first diode is connected to the cathode of the second diode and the cathode of the first diode is connected to the anode of the second diode.

3. The circuit of claim 2 wherein the first and second diodes are avalance diodes.

4. The circuit of claim 1 wherein the load is reflected to the load terminals as a resistive element.

5. The circuit of claim 1 wherein the load is reflected to the load terminals as a capacitive element.

6. The circuit of claim 1 wherein the load is reflected to the load terminals as a capacitive element and a resistance.

7. The circuit of claim 1 wherein the inductor includes a magnetic core, the current flowing through the inductor being such that the core is not saturated by the AC power line energy or energy coupled to the line by the spike.

8. The circuit of claim 1 wherein the load is an impedance that causes a substantial reduction in high frequency components relative to (a) a first suppression circuit having no breakdown means and a low pass filter with a series inductor and a shunt capacitor having the same values as the claimed inductor and capacitor and (b) a second suppression circuit having a bi-directional breakdown means in series with the claimed capacitor and a series inductor and shunt capacitor having the same values as the claimed inductor and shunt capacitor.

9. The circuit of claim 1 wherein the branch includes only linear elements.

10. In combination, AC power terminals, AC load terminals, a capacitor connected in a branch shunting the AC load terminals, an inductor and bi-directional breakdown means connected between the AC power terminals and AC load terminals so that the same current flows from one of the AC power terminals through the inductor and bi-directional breakdown means, said same current being divided to flow in parallel through the AC load terminals and the shunt branch.

11. The circuit of claim 10 wherein the branch includes only linear elements.

12. A circuit for suppressing transient spikes on an AC power line so as to largely decouple the effects of the spikes from an AC load connected to be driven by current flowing through a terminal of the power line comprising a series branch connected between the power line terminal and a terminal of the load, the series branch including in series an inductor and bi-directional breakdown means having a predetermined threshold conduction level such that it has relatively high and low impedances in response to the voltage across it being respectively less and greater than a threshold conduction level, a shunt branch connected across terminals of the load, the shunt branch and the load connected to the series branch to be responsive to current flowing through the inductor and breakdown means, the load being an impedance that causes a substantial reduction in high frequency components relative to (a) a first suppression circuit having no breakdown means and a low pass filter with a series inductor and a shunt capacitor having the same values as the claimed inductor and capacitor and (b) a second suppression circuit having a bi-directional breakdown means in series with the claimed capacitor and a series inductor and a shunt capacitor having the same values as the claimed inductor and shunt capacitor.

13. The circuit of claim 12 wherein the bi-directional breakdown means includes first and second parallel diodes each having an anode and cathode connected such that the anode of the first diode is connected to the cathode of the second diode and the cathode of the first diode is connected to the anode of the second diode.

14. The circuit of claim 13 wherein the first and second diodes are avalanche diodes.

15. The circuit of claim 12 wherein the load is reflected to the load terminals as a resistive element.

16. The circuit of claim 12 wherein the load is reflected to the load terminals as a capacitive element.

17. The circuit of claim 12 wherein the load is reflected to the load terminals as a capacitive element and resistance.

18. The circuit of claim 12 wherein the inductor includes a magnetic core, the current flowing through the inductor being such that the core is not saturated by the AC power line energy or energy coupled to the line by the spike.

19. The circuit of claim 12 wherein the shunt branch includes only linear elements.

* * * * *